(12) United States Patent
Becker

(10) Patent No.: US 8,285,743 B2
(45) Date of Patent: Oct. 9, 2012

(54) SCHEDULING VIEWING OF WEB PAGES IN A DATA PROCESSING SYSTEM

(75) Inventor: Craig Henry Becker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2807 days.

(21) Appl. No.: 10/179,316

(22) Filed: Jun. 24, 2002

(65) Prior Publication Data

US 2003/0236771 A1 Dec. 25, 2003

(51) Int. Cl.
*G06F 17/00* (2006.01)

(52) U.S. Cl. .................................. 707/770; 707/748
(58) Field of Classification Search .............. 707/1–10, 707/100–104.1, 200–205, 748, 770; 345/846; 715/513
See application file for complete search history.

(56) References Cited

U.S. PATENT DOCUMENTS

| | | | |
|---|---|---|---|
| 5,737,619 A | 4/1998 | Judson | 395/761 |
| 5,813,007 A | 9/1998 | Nielsen | 707/10 |
| 5,890,164 A | 3/1999 | Nielsen | 707/201 |
| 6,055,570 A | 4/2000 | Nielsen | 709/224 |
| 6,057,834 A * | 5/2000 | Pickover | 345/846 |
| 6,128,629 A | 10/2000 | Bretschneider et al. | 707/203 |
| 6,182,072 B1 | 1/2001 | Leak et al. | 707/10 |

OTHER PUBLICATIONS

Flesca et al., "Monitoring Web information changes", DEIS, Univ. della Calabria, 87030 Rende, Italy, Apr., 2-4, 2001, pp. 421-425.*
Gotoh et al., "User modeling and uplink scheduling in IP-based ITS network", Motorola Japan Research Lab, Motorola Japan Ltd, Tokyo, Japan, May 6-9, 2001, pp. 3027-3031.*
Shankaranarayanan et al. "User-perceived performance of Web-browsing and interactive data in HFC cable access networks", AT&T Labs-Research, NJ, USA, Jun. 11-14, 2001, pp. 1264-1268, vol. 4.*
Ho et al. "A GA-based dynamic personalized filtering for Internet search service on multi-search engine", Dept. of Elect. Eng., Ming-Hsin Institute of Tech., Taiwan, May 13-16, 2001, pp. 271-276.*
Lieberman, Henry, "An Automated Channel-Surfing Interface Agent for the Web", Media Laboratory, Massachusetts Institute of Technology, Mar. 25, 1997, http:www.info.unicaen.fr/~serge/3wia/workshop/papers/paper29.html, pp. 1-7.
Web page, "Automated Surfing", Mar. 25, 1997, http://www.netalive.com/autosurf.htm, pp. 1-2.
Web page, "Organizing the Chaos", Mar. 25, 1997, http://www.netalive.com/chaos.htm, pp. 1-2.
Web page, "Full Navigation, Online and Offline", Mar. 25, 1997, http://www.paperclip.com/products/offline.htm, p. 1.

\* cited by examiner

*Primary Examiner* — Shahid Alam
(74) *Attorney, Agent, or Firm* — Yee & Associates, P.C.; Jeffrey S. LaBaw

(57) ABSTRACT

A method, apparatus, and computer instructions for scheduling viewing of a plurality of selected Web pages. A respective periodicity for viewing each respective Web page of a plurality of selected Web pages is scheduled. Upon retrieval of a respective Web page at a specified periodicity, a determination is made as to whether the respective Web page has changed in which the respective Web page is a retrieved Web page. The retrieved Web page is placed in a queue of unviewed Web pages for later viewing by a user in response to the Web page having changed.

6 Claims, 7 Drawing Sheets

SCHEDULING VIEWING OF WEB PAGES IN A DATA PROCESSING SYSTEM

BACKGROUND OF THE INVENTION

1. Technical Field

The present invention relates generally to an improved data processing system, and in particular, to a method and apparatus for managing Web pages. Still more particularly, the present invention provides a method and apparatus for managing viewing of Web pages.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the Transmission Control Protocol/Internet Protocol (TCP/IP) suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a URL through a graphical user interface (GUI) for the browser to access a source of content. The URL includes a domain name plus a "file part" that points to a Web page within that domain. The domain name portion of the URL is automatically converted to the Internet Protocol (IP) address by a domain name system (DNS), which is a service that translates the symbolic name entered by the user into an IP address by looking up the domain name in a database.

Often times, a user may have one or more Web "publications" that the user wishes to read on some periodic basis. These Web publications may include articles or magazines published on the Web, cartoons or videos updated on some periodic basis, or some other informational site. Some of these Web sites are updated daily, while others are updated weekly or monthly. In some cases, the Web site may be updated at random times. Currently, a user is required to remember to visit a particular Web site at the appropriate time to be able to see the new pages or information. Often times, it may be hard to remember when sites are updated, especially when a user reads large numbers of sites. With sites that are updated on a random basis, a user is currently required to frequently return to that site in order to view new information or changes.

Therefore, it would be advantageous to have an improved method, apparatus, and computer instructions for viewing Web pages after they have been updated without requiring the user to remember to return to the Web site.

SUMMARY OF THE INVENTION

The present invention provides a method, apparatus, and computer instructions for scheduling viewing of a plurality of selected Web pages. A respective periodicity for viewing each respective Web page of a plurality of selected Web pages is scheduled. Upon retrieval of a respective Web page at a specified periodicity, a determination is made as to whether the respective Web page has changed in which the respective Web page is a retrieved Web page. The retrieved Web page is placed in a queue of unviewed Web pages for later viewing by a user in response to the Web page having changed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
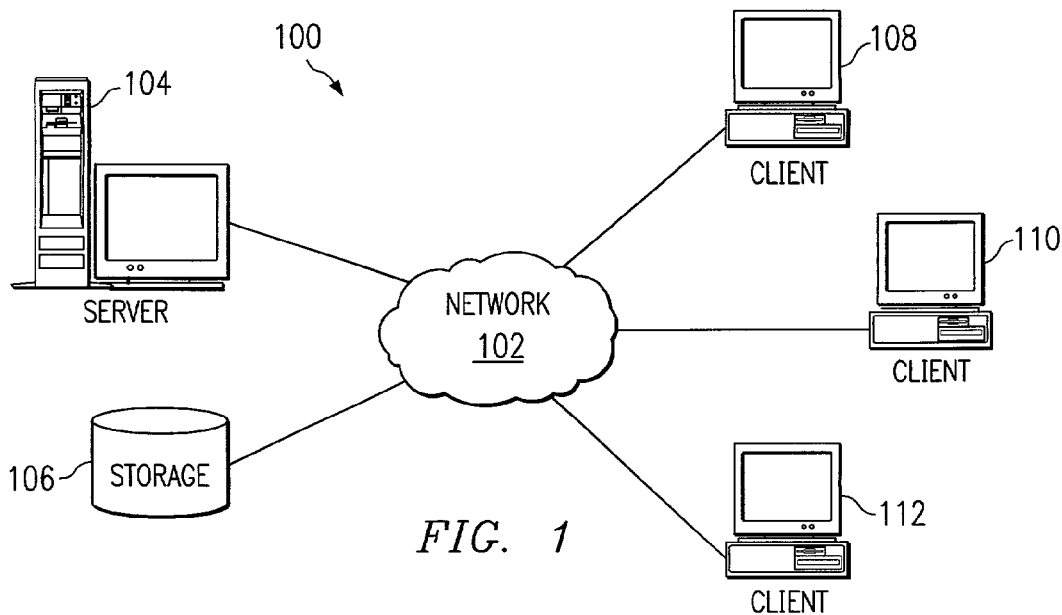
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
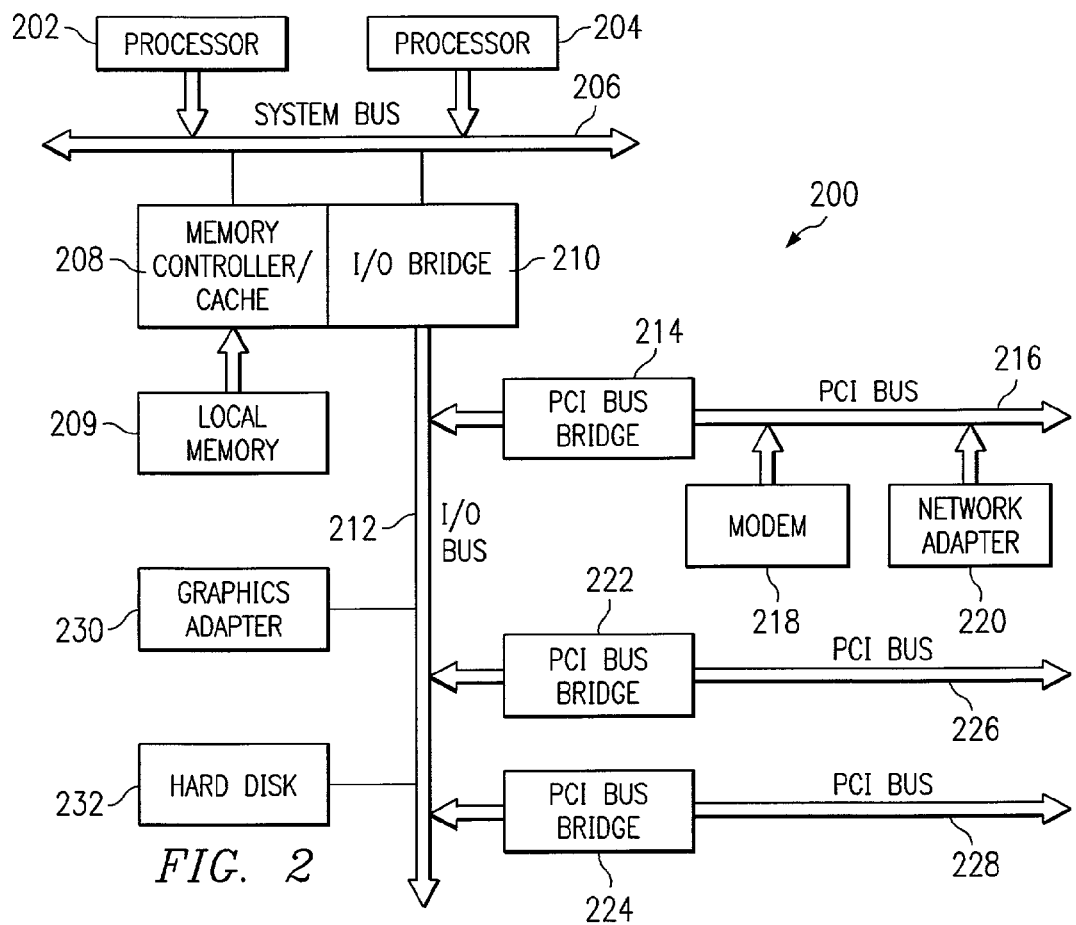
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
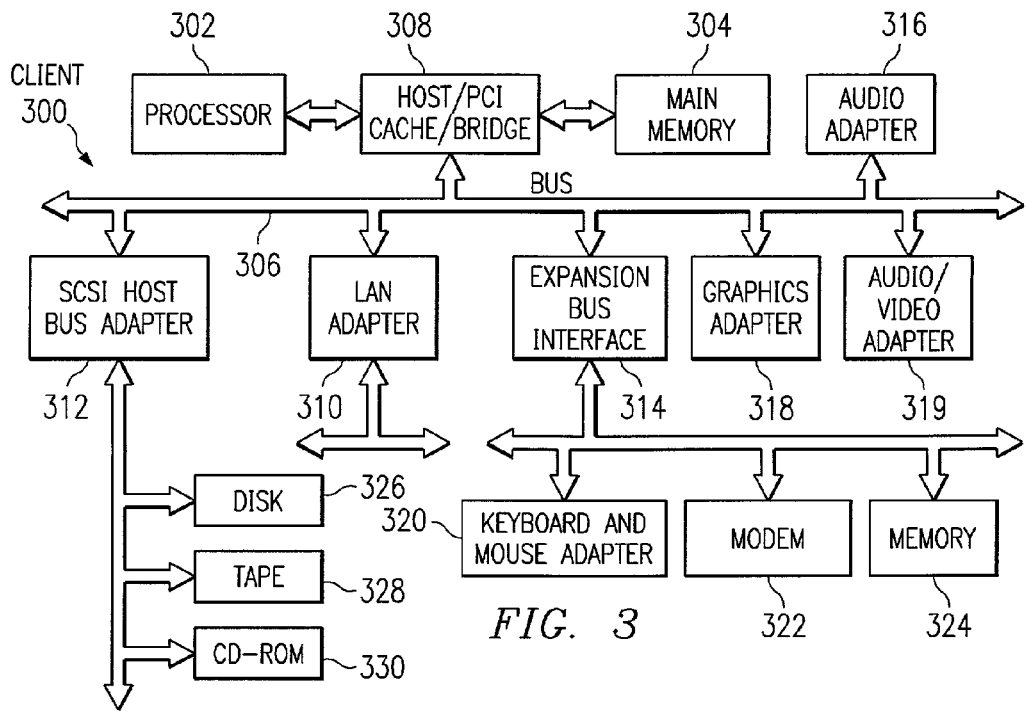
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
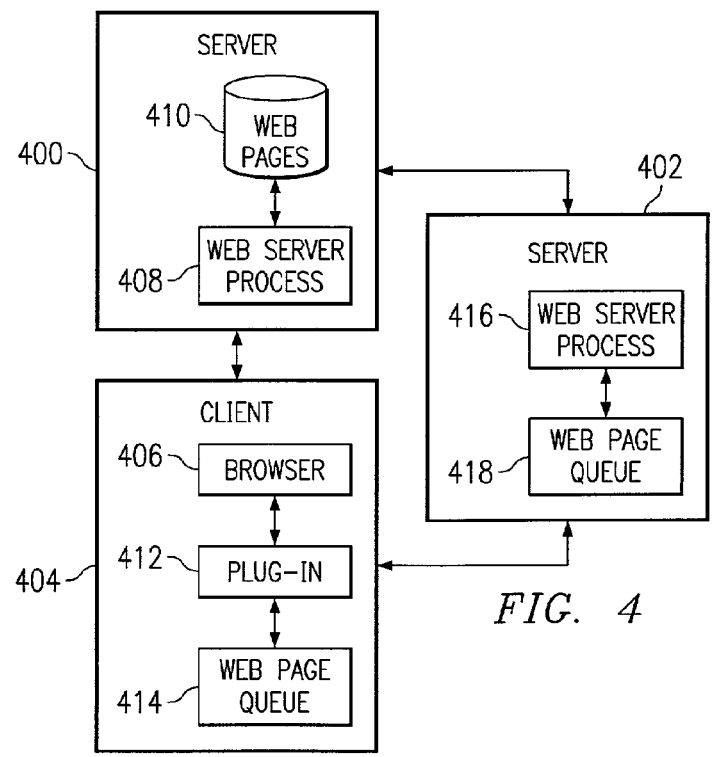
FIG. 4 is a diagram illustrating components used in scheduling viewing of Web pages in accordance with a preferred embodiment of the present invention.

Turning now to FIG. 4, a diagram illustrating components used in scheduling viewing of Web pages is depicted in accordance with a preferred embodiment of the present invention. In this example, server 400 and server 402 may be implemented using a data processing system, such as data processing system 200 in FIG. 2. Client 404 may be implemented using a data processing system, such as data processing system 300 in FIG. 3.

A user at client 404 may view Web pages through browser 406. Specifically, browser 406 may request a Web page from server 400 by sending the request to Web server process 408. In response, Web server process 408 retrieves an appropriate Web page from Web pages database 410 and returns the Web page to browser 406 for presentation. If the particular universal resource locator (URL) points to a Web page that changes, the user may schedule viewing of the Web page without having to return to the Web page each day, week, or on whatever time basis the Web page is updated at that URL.

The mechanism of the present invention allows a user to register an interest in a Web page by entering the URL for a Web page and to schedule some time to view or retrieve Web pages for viewing. The scheduling may be, for example, periodic or a one-time event. Many Web publications would be scheduled on a periodic basis while other events, such as the winner of a contest, may be scheduled for a single retrieval. Alternatively, the Web page pointed to by the URL may be monitored for content changes. Such monitoring may involve storing the last modified time of the page or an actual copy of the page and periodically checking for updates or changes to the page. The mechanism of the present invention may store URLs in a file or cache for use in retrieving Web pages for review. Alternatively, the Web pages themselves may be retrieved and stored in a cache for later viewing.

These processes may be implemented in browser 406, or in some other program, such as, for example, plug-in 412. A browser is the program that serves as a front end to the World Wide Web on the Internet. In order to view a Web site, a URL is typed into the browser's location field. Browser 406 may be implemented using various well-known browsers, such as Internet Explorer from Microsoft Corporation or Opera from Opera Software. A plug-in is an auxiliary program that works with a major software package to enhance its capability.

In this case, plug-in 412 is used to enhance browser 406. In this case, plug-in 412 may retrieve Web pages from registered addresses in Web page queue 414. Web pages retrieved by plug-in 412 may be stored in association with URLs. Further, the pages also may be placed in an order based on, for example, date modified, frequency of updates, or on some user selected priority. For example, a user may want to view Web pages updated on a daily basis before viewing Web pages updated on a weekly basis.

Alternatively, the mechanism of the present invention may be implemented on a remote data processing system, such as server 402. In this case, Web server process 416 in server 402 includes the processes for registering a URL as well as storing Web pages in Web page queue 418. In this type of implementation, a user may enter an address to Web server process 416 at browser 406. The user may log in or be validated via another mechanism, such as a cookie. After the log in, the user may be "seamlessly" forwarded to a chosen home page at which the user may register and schedule addresses for Web pages as well as view Web pages. In either case, a user may be informed via an indicator, such as a pop-up window or a frame, when a page view event occurs and may have the option of viewing the page, aborting viewing of the page, or delaying viewing of the page. A page view event occurs, in these examples, when an unviewed page is stored or queued for viewing by a user. Another feature of the present invention includes providing an indication of a registered page that has not changed since the last viewing by the user.

Figure 5:
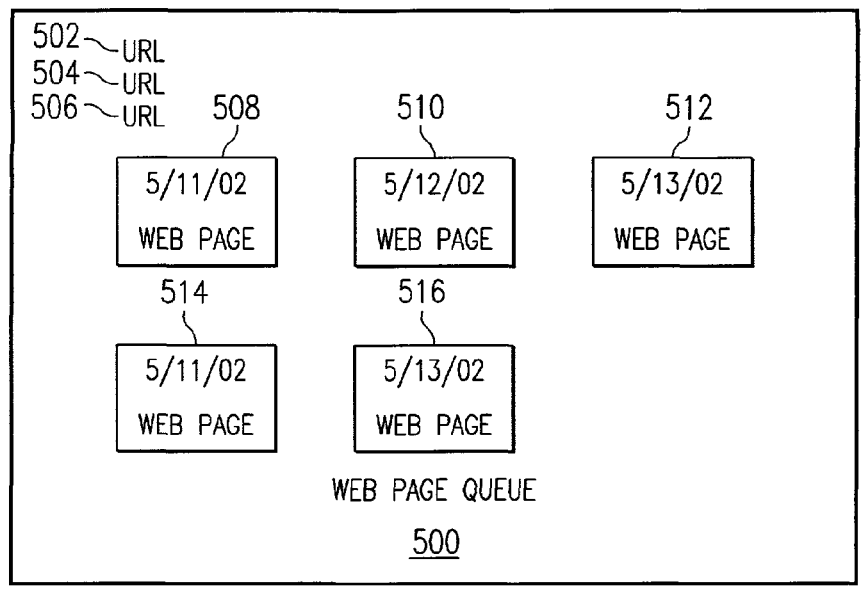
FIG. 5 is a diagram illustrating a Web page queue in accordance with a preferred embodiment of the present invention.

With reference now to FIG. 5, a diagram illustrating a Web page queue is depicted in accordance with a preferred embodiment of the present invention. In this example, Web page queue 500 is an example of a Web page queue, such as Web page queue 414 or Web page queue 418 in FIG. 4.

As illustrated, Web page queue 500 contains URLs 502, 504, and 506. These URLs are stored in Web page queue 500 when an update to the particular page pointed to by these URLs has changed. As described above, these changes may be anticipated as occuring on a periodic basis or by monitoring the Web page for changes. With these URLs, the mechanism of the present invention may retrieve the Web pages identified by these pointers for presentation to the user for review. These URLs are the URLs registered by the user and are placed in this queue when it is time to view a particular Web page based on the particular schedule or monitoring selected by the user.

In addition, Web page queue 500 also includes Web pages 508, 510, 512, 514, and 516. These Web pages are examples of pages retrieved based on a schedule set up by the user. Web pages 508, 510, and 512 are associated with one URL, while Web pages 514 and 516 are associated with another URL. A user may be prompted to view one of these Web pages as retrieved if the user is logged in or if the plug-in is executing. If the user has not logged in or has not looked at pages over a period of time, these pages may be accumulated in Web page queue 500 for later viewing. Further, a Web page queue may include information such as whether a registered page has been changed since the last viewing by a user. In addition, changes to a particular page may be stored within Web page queue 500. In other words, if a registered Web page changes three times, all three instances of these pages may be stored in Web page queue 500, such as Web pages 508, 510, and 512, which are associated with a single URL. In this manner, a user may view all of the changes or updates to a Web page since the last viewing of a particular registered page. These pages may be stored in chronological order for presentation to the user. All versions of a registered Web page may be stored within Web page queue 500 with indicators of viewed pages and unviewed pages. Alternatively, only unviewed pages may be retained within Web page queue 500.

Further, an indication may be provided to indicate to the user whether a particular page has changed. Also, the number of versions of a page also may be indicated to a user. These indications may be presented in various fashions, such as, for example, the use of a watermark across the page or text in a status bar in the browser.

These examples illustrate Web pages associated with addresses, such as URLs. In addition or alternatively, the Web pages or URLs stored in Web page queue 500 may be ordered based on some criteria, which may be preset or selected by the user. Criteria may be based on, for example, how often the Web pages are updated, on the date the Web page was updated, or based on some priority assigned by the user.

Turning now to FIGS. 6A-6D, diagrams illustrating a graphical user interface for scheduling and viewing Web pages are depicted in accordance with a preferred embodiment of the present invention. These interfaces are examples of interfaces that may be presented in a browser, such as browser 406 in FIG. 4.

Figure 6A:
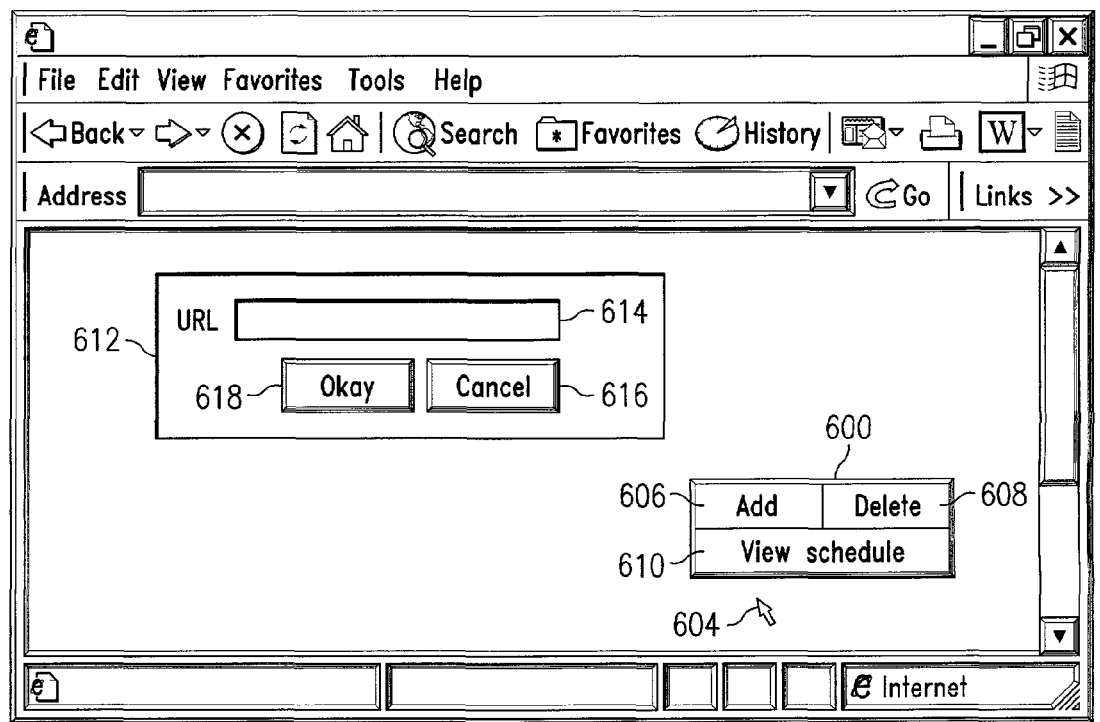
FIGS. 6A-6D are diagrams illustrating a graphical user interface for scheduling and viewing Web pages in accordance with a preferred embodiment of the present invention.

In FIG. 6A, menu 600 is displayed within browser 602. Addresses may be registered and removed through a user manipulating pointer 604 to select "add" button 606 or "delete" button 608. A schedule of all addresses may be viewed through selection of "view schedule" button 610. Upon selection of "add" button 606, pop-up window 612 is presented to allow the user to register an address by typing in the URL in field 614. The addition of an address may be cancelled by selecting "cancel" button 616.

Figure 6B:
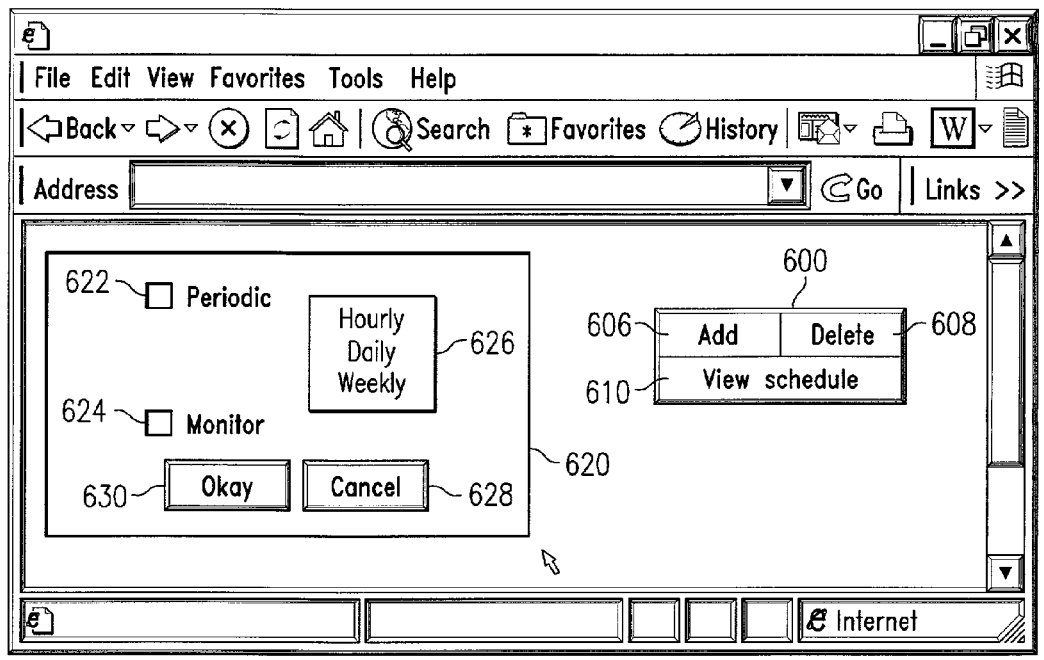

If the address entered into field 614 is correct and the user selects "okay" button 618, then pop-up window 620 in FIG. 6B is presented to the user. Pop-up window 620 provides a user with an option to select a scheduling mechanism through the selection of check box 622 or check box 624. If the user selects check box 622, drop-down menu 626 is provided to allow the user to select a period during which pages from the address are retrieved. In this example, the periods are hourly, daily, and weekly. Selection of one of these options results in a schedule being set for the registered address. For example, if daily is selected, the Web page at the registered address will be pulled on a daily basis beginning on the day on which the URL was registered. Alternatively, by selecting check box 624, a monitoring mechanism is used in which changes in the content of the Web page are checked to determine whether to retrieve the Web page at the registered address. Changes may be identified in various ways. For example, the last modified time of the page may be stored and compared to that of the page each time the address is checked. This option is especially useful for situations in which the Web page may be changed or updated on a random basis, rather than on some predictable periodic basis. This monitoring option also is useful if a user knows an address is updated periodically, but does not remember the date on which the update occurs.

Figure 6C:
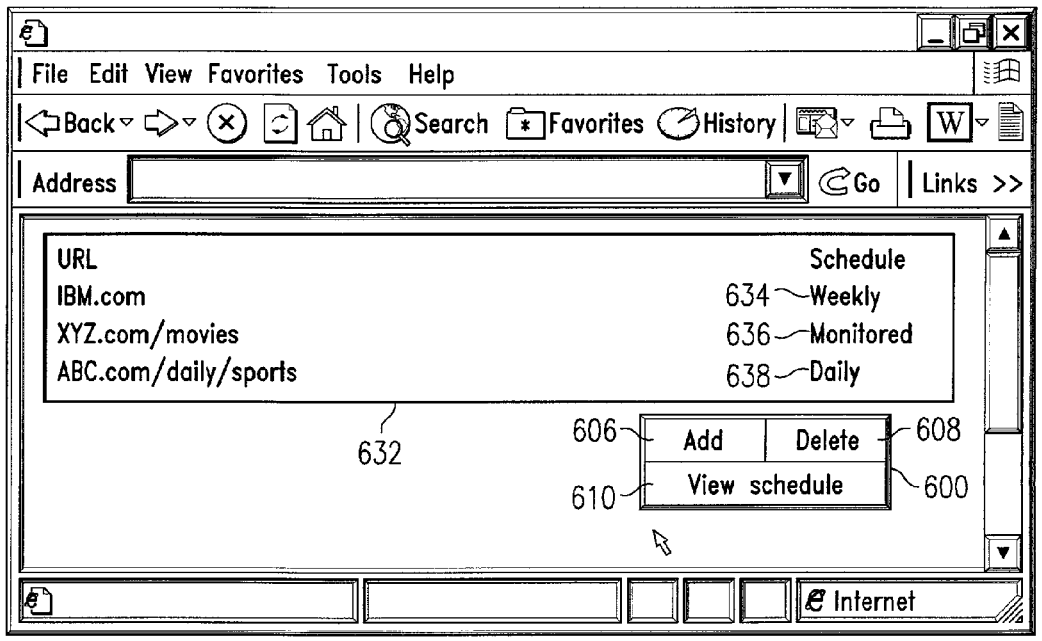

Selection of "cancel" button 628 results in pop-up window 620 being removed from presentation without setting up a schedule. Selection of "okay" button 630 results in the selections being added to the schedule. By selecting "view schedule" button 610, pop-up window 632 in FIG. 6C is presented. This pop-up window contains a schedule of addresses to be checked from which Web pages are to be retrieved or monitored. In this example, entries 634, 636, and 638 are present in the schedule. Each entry includes a URL and a schedule type, such as daily, weekly, or monitored. A user may delete one of these schedules by selecting the schedule and selecting "delete" button 608. In addition, entries 634, 636, and 638, also may include indications to tell a user whether a page corresponding to the URL has changed since the user has last viewed the particular registered page. This indication may be provided through various graphical mechanisms, such as highlighting the text in the entry, displaying the text in an entry in a different color or font, or by adding a graphical icon next to a particular entry. These types of indications may be used or not used as an option set by the user.

Figure 6D:
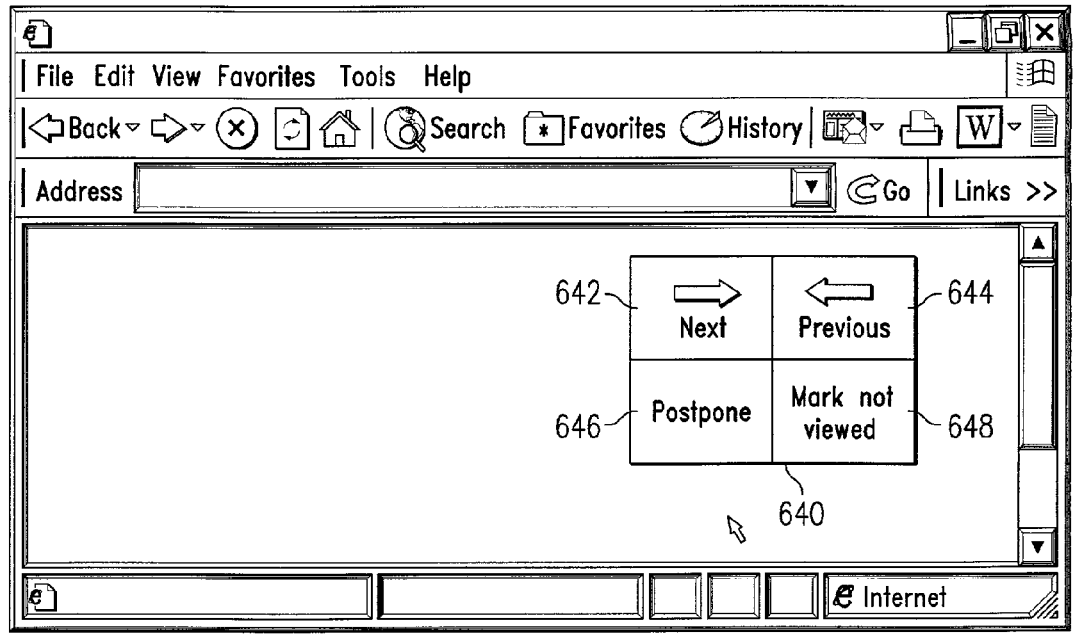

When a Web page is retrieved, or when the user starts browser 602 and unviewed Web pages are present, menu 640 in FIG. 6D is presented to the user. In this example, menu 640 includes "next" button 642, "previous" button 644, "postpone" button 646, and "mark not viewed" button 648. "Next" button 642 and "previous" button 644 allow Web pages stored in the Web page queue to be presented to the user. Selection of "next" button 642 results in the next Web page in the queue being presented, while the selection of "previous" button 644 allows a previous Web page to be redisplayed in browser 602. Depending on the particular implementation, the retrieval of the Web page may be performed by using a URL stored in the queue and retrieving the Web page for that URL.

"Postpone" button 646 allows for the user to postpone viewing the Web pages until a later time. Selection of this button results in menu 640 being removed from display. Selection of "mark not viewed" button 648 allows a Web page being presented in browser 602 to be marked as not viewed. As a result, the next time browser 602 is started, menu 640 will be presented because at least one Web page has not been viewed. These examples illustrate a local implementation of the scheduling and viewing processes. Of course, similar menus may be presented to the user in a remote implementation through the use of applets. Alternatively, the different fields and controls may be presented and handled through HTML pages with the different menus being presented in a first frame and the stored Web pages being presented in a second frame. Further, the presentation of the menu may take other forms, such as, for example, a multiple browser window interface.

Depending on the particular implementation, the handling of viewed pages may vary. Pages may continue to be stored until some threshold limit is reached. Alternatively, pages may be discarded after they are viewed or stored in another location by the user. If URLs are stored in the cache, the URLs may be marked with a flag or some other indicator to indicate unviewed pages. Also, URLs for viewed pages may be discarded from the cache while URLs for unviewed pages may be retained in the cache.

Figure 7:
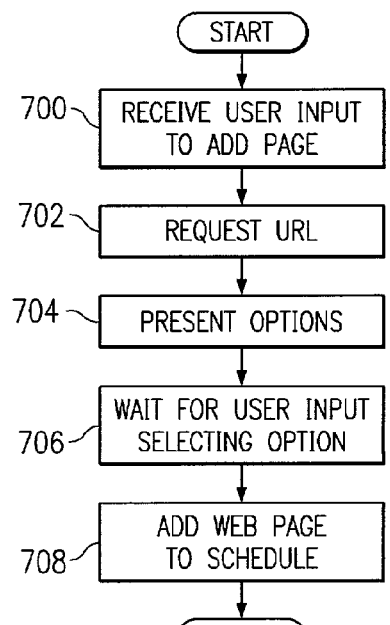
FIG. 7 is a flowchart of a process used for registering an address in accordance with a preferred embodiment of the present invention.

Turning now to FIG. 7, a flowchart of a process used for registering an address is depicted in accordance with a preferred embodiment of the present invention. The process illustrated in FIG. 7 may be implemented in a plug-in or server, such as plug-in 412 or Web server process 416 in FIG. 4.

The process begins by receiving a user input to add a page (step 700). This user input may be received through a menu, such as pop-up menu 600 in FIG. 6A. A URL is requested (step 702) and the options are presented (step 704). The URL may be entered into a pop-up window such as pop-up window 612 in FIG. 6A. The options may be presented through a window, such as pop-up window 620 in FIG. 6B. The process waits for user input selecting an option (step 706). The Web page is added to the schedule (step 708) and the process terminates thereafter.

Figure 8:
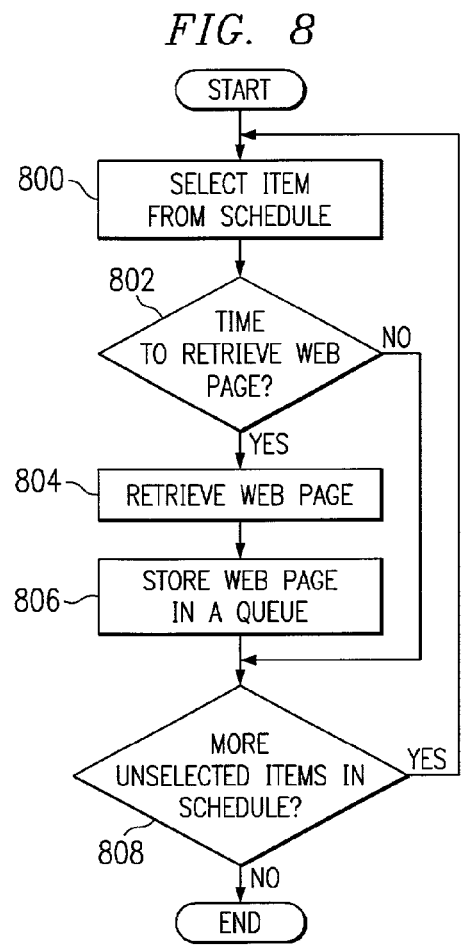
FIG. 8 is a flowchart of a process used for retrieving Web pages based on a schedule in accordance with a preferred embodiment of the present invention.

With reference now to FIG. 8, a flowchart of a process used for retrieving Web pages based on a schedule is depicted in accordance with a preferred embodiment of the present invention. The process illustrated in FIG. 8 may be implemented in a plug-in or server, such as plug-in 412 or Web server process 416 in FIG. 4.

The process begins by selecting an item from a schedule (step 800). The item is one that has not been selected for processing. A determination is made as to whether it is time to retrieve a Web page (step 802). This determination may be made by identifying the period during which a page is to be retrieved, such as daily or weekly. If the period of time has elapsed, then it is time to retrieve the Web page and the Web page is retrieved (step 804). The Web page is stored in a queue (step 806). In these examples, the queue is a Web page queue, such as Web page queue 414 or Web page queue 418 in FIG. 4. The pages are stored in the queue using some sort of priority or ordering system. This may be default ordering or one selected by the user. For example, the pages may be ordered based on the time of retrieval, in association with a URL, or based on the time of retrieval and a URL.

Next a determination is made as to whether more unselected items are present in the schedule (step 808). If more unselected items are not present in the schedule, the process terminates. Otherwise, the process returns to step 800 as described above.

With reference again to step 802, if it is not time to retrieve a Web page or the time has not elapsed, the process proceeds to step 808 as described above.

Figure 9:
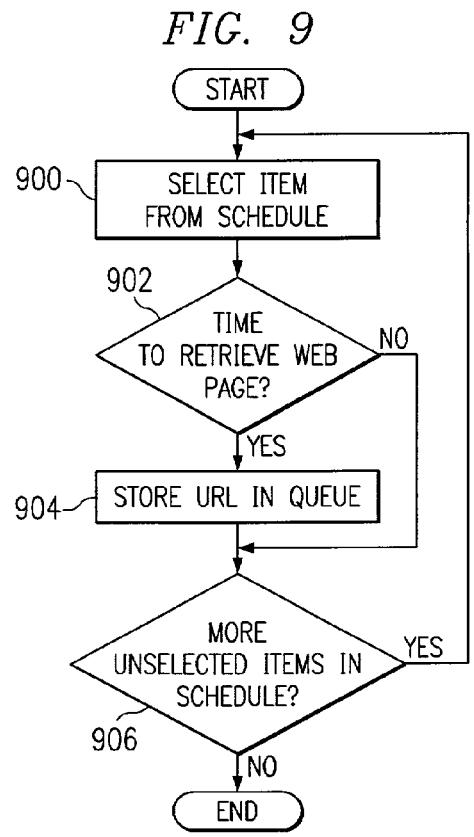
FIG. 9 is a flowchart of a process used for retrieving Web pages based on a schedule in accordance with a preferred embodiment of the present invention.

With reference now to FIG. 9, a flowchart of a process used for retrieving Web pages based on a schedule is depicted in accordance with a preferred embodiment of the present invention. The process illustrated in FIG. 9 may be implemented in a plug-in or server, such as plug-in 412 or Web server process 416 in FIG. 4.

The process begins by selecting an item from a schedule (step 900). The item is one that has not been selected for processing. A determination is made as to whether it is time to retrieve a Web page (step 902). This determination may be made by identifying the period during which a page is to be retrieved, such as daily or weekly. If the period of time has elapsed, then it is time to view the Web page and the URL for the Web page is stored in the queue (step 904). In these examples, the queue is a Web page queue, such as Web page queue 414 or Web page queue 418 in FIG. 4. These URLs are stored in the queue using some sort of priority or ordering system. This may be default ordering or one selected by the user. For example, the URLs may be ordered based on the time of retrieval, or based on the time of retrieval and a priority selected by a user.

Next, after the URL is stored in the queue, a determination is made as to whether more unselected items are present in the schedule (step 906). If more unselected items are not present in the schedule, the process terminates. Otherwise, the process returns to step 900 as described above.

With reference again to step 902, if it is not time to retrieve a Web page or the time has not elapsed, the process proceeds to step 906 as described above.

Figure 10:
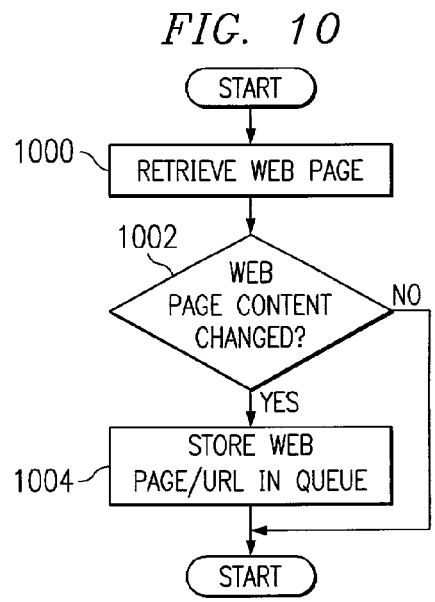
FIG. 10 is a flowchart of a process used for monitoring a Web page for changes in accordance with a preferred embodiment of the present invention.

Turning now to FIG. 10, a flowchart of a process used for monitoring a Web page for changes is depicted in accordance with a preferred embodiment of the present invention. The process illustrated in FIG. 10 may be implemented in a plug-in or server, such as plug-in 412 or Web server process 416 in FIG. 4.

The process begins by retrieving a Web page (step 1000). A determination is made as to whether the content in the Web page has changed (step 1002). This determination may be made in various ways. For example, a last modified time of the page, stored from the last retrieval of the Web page, may be compared to the last modified time of the Web page retrieved in step 1000. If the current page contains a newer last modified time, then the content is changed. If the last modified time is the same, then no change in the content is assumed to have occurred. Alternatively, a copy of the page may be stored from a previous retrieval and compared to the retrieved page to determine whether differences in content are present. Changes in content also may be identified through page signatures, such as checksums for the pages. If the content in the Web page has changed, the Web page is stored in a queue (step 1004) and the process terminates thereafter.

Returning again to step 1002, if the content of the Web page has not changed, the process terminates.

Figure 11:
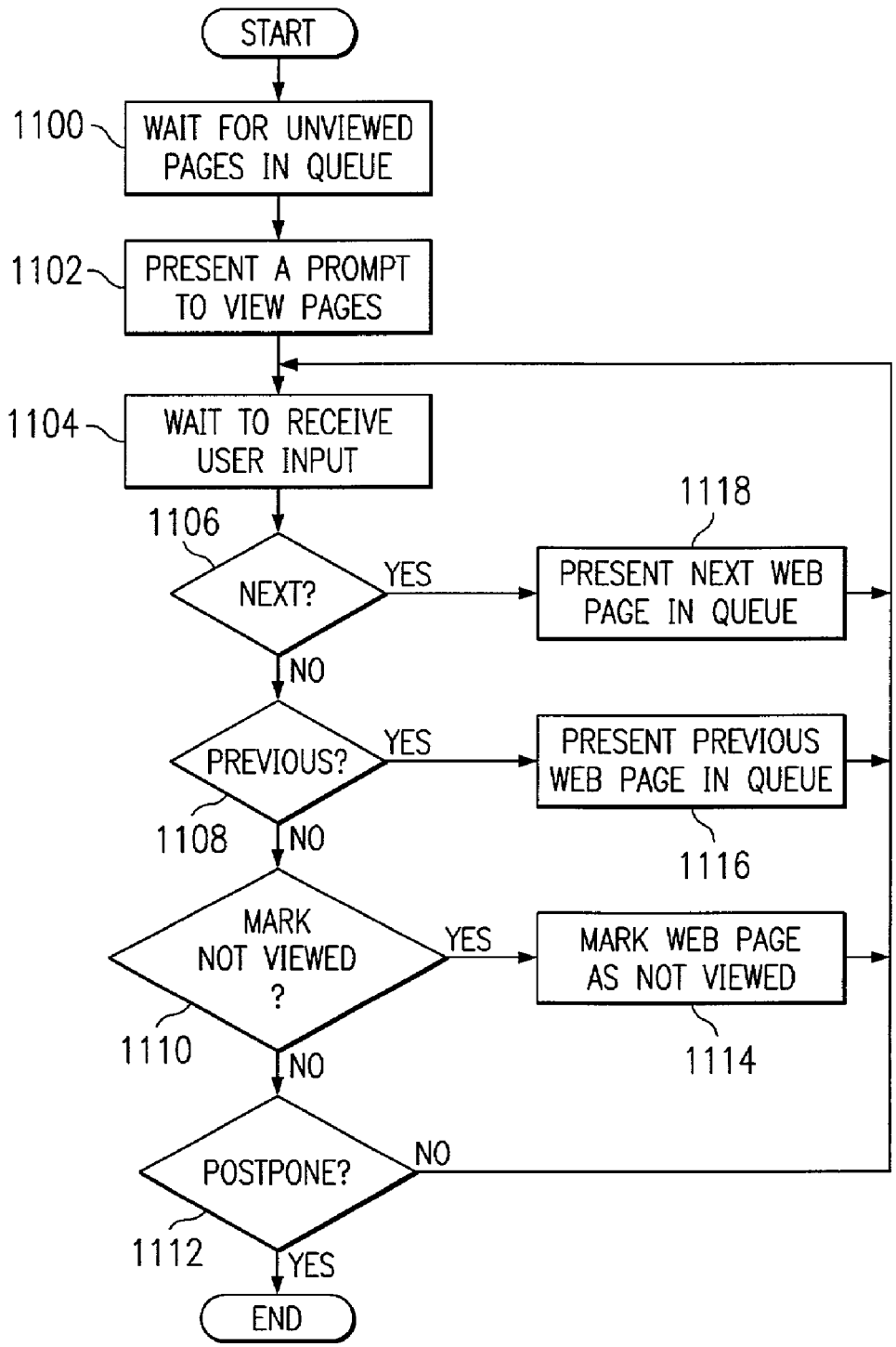
FIG. 11 is a flowchart of a process used for viewing pages in accordance with a preferred embodiment of the present invention.

With reference now to FIG. 11, a flowchart of a process used for viewing pages is depicted in accordance with a preferred embodiment of the present invention. The process illustrated in FIG. 11 may be implemented in a plug-in or server, such as plug-in 412 or Web server process 416 in FIG. 4.

The process begins by waiting for unviewed pages to be present in the queue (step 1100). When unviewed pages are present in the queue, a prompt or some other alert is presented to the user to indicate that pages are available for viewing (step 1102). Next, the process waits to receive a user input (step 1104). In these examples, the user input is received through a menu, such as menu 640 in FIG. 6D. When a user input is received, a determination is made as to whether the user input is a selection of the "next" button (step 1106). If the user input is not a selection of the "next" button, a determination is made as to whether the user input is a selection of the "previous" button (step 1108). If the user input is not a selection of the "previous" button, a determination is made as to whether to mark the Web page as not viewed (step 1110). If the Web page is not to be marked not viewed, a determination is made as to whether the user input is the selection of a "postpone" button (step 1112). If the user input is to postpone viewing of the Web pages, the process terminates.

Returning again to step 1112, if user input does not postpone viewing of the Web pages, the process returns to step 1104 as described above. With reference again to step 1110, if the Web page is to be marked as not viewed, the Web page currently being presented is marked as not viewed (step 1114) and the process returns to step 1104. With respect to step 1114, if the page is marked as not viewed, this page also would be returned to the end of the queue. Referring again to step 1108, if the user input is a selection of the "previous" button, the previous Web page in the queue is presented (step 1116) and the process returns to step 1104. With reference again to step 1106, if the user input is the selection of the "next" button, the next Web page in the queue is presented (step 1118) and the process returns to step 1104. As described above, the order in which the pages are presented is based on the ordering of pages or URLs within the queue. Again, this ordering may be based on some default scheme or one defined by the user.

Thus, the present invention provides an improved method, apparatus, and computer instructions for retrieving and viewing Web pages, which may be updated on some periodic or random basis. The mechanism provides an automatic and seamless mechanism for retrieving Web pages based on a schedule set up by the user. These Web pages are presented to the user and may be viewed sequentially in an order based on some scheme. In this manner, a user does not have to continually check a URL for a Web page that is randomly updated. Further, the user does not have to remember when pages are updated and check those addresses.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for scheduling viewing of a plurality of selected Web pages, the method comprising:
    scheduling a respective periodicity for viewing each respective Web page of a plurality of selected Web pages;
    upon retrieval of a respective Web page at a specified periodicity, determining whether the respective Web page has changed, wherein the respective Web page is a retrieved Web page;
    responsive to the retrieved Web page having changed, placing the retrieved Web page in a queue of unviewed Web pages for later viewing by a user; and
    placing the unviewed Web pages in an order according to a set of criteria, wherein the set of criteria includes at least one of frequency of update, degree of change, and a priority of a Web page.

2. A method in a data processing system for scheduling viewing of a plurality of selected Web pages, the method comprising:
    scheduling a respective periodicity for viewing each respective Web page of a plurality of selected Web pages;
    upon retrieval of a respective Web page at a specified periodicity, determining whether the respective Web page has changed, wherein the respective Web page is a retrieved Web page;
    responsive to the retrieved Web page having changed, placing the retrieved Web page in a queue of unviewed Web pages for later viewing by a user;
    presenting the queue of unviewed Web pages to the user; and
    responsive to a particular user input, placing an unviewed Web page into another queue.

3. A method in a data processing system for retrieving Web pages, the method comprising:
    identifying a Web page for retrieval using an identifier;
    using the identifier to retrieve the Web page based on a schedule set for the Web page, wherein the Web page forms a retrieved Web page after the Web page has been retrieved;
    storing the retrieved Web page in a queue with other retrieved Web pages for later viewing; and
    displaying the retrieved Web pages stored in the queue in an order specified by a policy, wherein the policy includes at least one of association of Web pages, frequency of update, degree of change, and a priority of a Web page.

4. A data processing system for scheduling viewing of a plurality of selected Web pages, the data processing system comprising:
    scheduling means for scheduling a respective periodicity for viewing each respective Web page of a plurality of selected Web pages;
    determining means, upon retrieval of a respective Web page at a specified periodicity, for determining whether the respective Web page has changed in which the respective Web page is a retrieved Web page;
    first placing means, responsive to the retrieved Web page having changed, for placing the retrieved Web page in a queue of unviewed Web pages for later viewing by a user; and
    second placing means for placing the unviewed Web pages in an order according to a set of criteria, wherein the set of criteria includes at least one of frequency of update, degree of change, and a priority of a Web page.

5. A data processing system for scheduling viewing of a plurality of selected Web pages, the data processing system comprising:
    scheduling means for scheduling a respective periodicity for viewing each respective Web page of a plurality of selected Web pages;
    determining means, upon retrieval of a respective Web page at a specified periodicity, for determining whether the respective Web page has changed in which the respective Web page is a retrieved Web page;
    first placing means, responsive to the retrieved Web page having changed, for placing the retrieved Web page in a queue of unviewed Web pages for later viewing by a user;
    presenting means for presenting the queue of unviewed Web pages to the user; and
    second placing means, responsive to a particular user input, for placing an unviewed Web page into another queue.

6. A data processing system for retrieving Web pages, the data processing system comprising:
    identifying means for identifying a Web page for retrieval using an identifier;
    using means for using the identifier to retrieve the Web page based on a schedule set for the Web page, wherein the Web page forms a retrieved Web page after the Web page has been retrieved;
    storing means for storing the retrieved Web page in a queue with other retrieved Web pages for later viewing; and
    displaying means for displaying the retrieved Web pages stored in the queue in an order specified by a policy, wherein the policy includes at least one of association of Web pages, frequency of update, degree of change, and a priority of a Web page.

* * * * *